(12) United States Patent
Sundaram (10) Patent No.: US 8,808,426 B2
(45) Date of Patent: Aug. 19, 2014

(54) INCREASING SCALES, CAPACITIES, AND/OR EFFICIENCIES IN SWING ADSORPTION PROCESSES WITH HYDROCARBON GAS FEEDS

(75) Inventor: Narasimhan Sundaram, Annandale, VA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 141 days.

(21) Appl. No.: 13/602,750

(22) Filed: Sep. 4, 2012

(65) Prior Publication Data

US 2014/0060326 A1    Mar. 6, 2014

(51) Int. Cl.
    *B01D 53/047*     (2006.01)
(52) U.S. Cl.
    USPC ........ 95/96; 95/113; 95/138; 95/139; 95/143; 95/144
(58) Field of Classification Search
    USPC ............. 95/96, 107, 113, 138, 139, 143, 144; 96/125
    See application file for complete search history.

(56) References Cited

U.S. PATENT DOCUMENTS

| | | | | |
|---|---|---|---|---|
| 2,727,585 | A | * | 12/1955 | Zankey ............................ 96/129 |
| 2,771,964 | A | * | 11/1956 | Miller ............................. 95/113 |
| 2,877,861 | A | * | 3/1959 | Miller ............................. 95/113 |
| 2,989,383 | A | | 6/1961 | Miller |
| 3,594,983 | A | | 7/1971 | Yearout |
| 4,094,652 | A | | 6/1978 | Lowther |
| 4,269,611 | A | | 5/1981 | Anderberg |
| 4,312,641 | A | | 1/1982 | Verrando et al. |
| 4,329,158 | A | | 5/1982 | Sircar |
| 4,350,501 | A | | 9/1982 | Bannon |
| 4,424,837 | A | | 1/1984 | Farrell |
| 4,433,707 | A | | 2/1984 | Farnham |

(Continued)

FOREIGN PATENT DOCUMENTS

| | | |
|---|---|---|
| CN | 101475430 A | 7/2009 |
| EP | 1 421 986 B1 | 5/2004 |

(Continued)

OTHER PUBLICATIONS

Ruthven, D. M., Thaeron, C. "Performance of a parallel passage adsorbent contactor", Separation and Purification Technology, vol. 12 (1997), pp. 43-60.

(Continued)

*Primary Examiner* — Frank Lawrence, Jr.
(74) *Attorney, Agent, or Firm* — David M. Weisberg (57) ABSTRACT

The invention relates to an increased efficiency high-capacity pressure and/or temperature swing adsorption process comprising: contacting a feedstream at a rate of more than 75 MSCFD with an adsorbent material under conditions sufficient for the adsorbent material to selectively adsorb at least one of the component gases in the feedstream, so as to form a first effluent; and selectively desorbing the adsorbed gas from the adsorption material, so as to form a second effluent The adsorption module can contain rotary valves both on the feed end and on the product end and a rotational member defining a central rotational axis, with the adsorption bed(s) oriented circumferentially thereto. The adsorption bed walls can be angled, the feed end cross-sectional area of the adsorption bed(s) can be larger than the product end, and/or the feed end rotary valve diameter of the module(s) can be larger than the product end.

21 Claims, 2 Drawing Sheets

(56) References Cited

U.S. PATENT DOCUMENTS

| | | | |
|---|---|---|---|
| 4,698,072 A * | 10/1987 | Rohde et al. | ............ 95/119 |
| 4,702,903 A | 10/1987 | Keefer | |
| 4,705,627 A * | 11/1987 | Miwa et al. | ............ 210/264 |
| 4,729,982 A | 3/1988 | Thistlethwaite et al. | |
| 4,753,919 A | 6/1988 | Whittenberger | |
| 4,772,579 A | 9/1988 | Thistlethwaite et al. | |
| 4,801,308 A | 1/1989 | Keefer | |
| 4,863,497 A * | 9/1989 | Grenier et al. | ............ 96/123 |
| 4,914,218 A | 4/1990 | Kumar et al. | |
| 4,968,329 A | 11/1990 | Keefer | |
| 5,057,296 A | 10/1991 | Beck | |
| 5,074,892 A | 12/1991 | Leavitt | |
| 5,082,473 A | 1/1992 | Keefer | |
| 5,089,034 A | 2/1992 | Markovs et al. | |
| 5,098,684 A | 3/1992 | Kresge et al. | |
| 5,102,643 A | 4/1992 | Kresge et al. | |
| 5,108,725 A | 4/1992 | Beck et al. | |
| 5,141,725 A | 8/1992 | Ramprasad et al. | |
| 5,171,333 A | 12/1992 | Maurer | |
| 5,225,174 A | 7/1993 | Friesen et al. | |
| 5,256,172 A | 10/1993 | Keefer | |
| 5,268,021 A * | 12/1993 | Hill et al. | ............ 95/98 |
| 5,516,745 A | 5/1996 | Friesen et al. | |
| 5,626,033 A | 5/1997 | Tamhankar et al. | |
| 5,827,358 A * | 10/1998 | Kulish et al. | ............ 96/115 |
| 5,846,295 A | 12/1998 | Kalbassi et al. | |
| 5,958,368 A | 9/1999 | Ryoo et al. | |
| 6,051,050 A | 4/2000 | Keefer et al. | |
| 6,063,161 A | 5/2000 | Keefer et al. | |
| 6,077,457 A | 6/2000 | Friesen et al. | |
| 6,080,226 A | 6/2000 | Dolan et al. | |
| 6,136,222 A | 10/2000 | Friesen et al. | |
| 6,197,092 B1 | 3/2001 | Butwell et al. | |
| 6,293,998 B1 | 9/2001 | Dolan et al. | |
| 6,315,817 B1 | 11/2001 | Butwell et al. | |
| 6,406,523 B1 | 6/2002 | Connor et al. | |
| 6,475,265 B1 | 11/2002 | Baksh et al. | |
| 6,514,318 B2 | 2/2003 | Keefer | |
| 6,607,584 B2 | 8/2003 | Moreau et al. | |
| 6,629,525 B2 | 10/2003 | Hill et al. | |
| 6,651,658 B1 | 11/2003 | Hill et al. | |
| 6,652,627 B1 | 11/2003 | Tonkovich et al. | |
| 6,691,702 B2 | 2/2004 | Appel et al. | |
| 6,802,970 B2 * | 10/2004 | Rochette | ............ 210/264 |
| 7,049,259 B1 | 5/2006 | Deckman et al. | |
| 7,231,784 B2 | 6/2007 | Howard et al. | |
| 7,270,792 B2 | 9/2007 | Deckman et al. | |
| 7,491,250 B2 | 2/2009 | Hershkowitz et al. | |
| 7,507,274 B2 | 3/2009 | Tonkovich et al. | |
| 7,524,358 B2 | 4/2009 | Saxena et al. | |
| 7,527,670 B2 | 5/2009 | Ackley et al. | |
| 7,799,730 B2 | 9/2010 | Ringer et al. | |
| 7,803,215 B2 | 9/2010 | Russell et al. | |
| 7,938,886 B2 | 5/2011 | Hershkowitz et al. | |
| 7,959,720 B2 | 6/2011 | Deckman et al. | |
| 2003/0015093 A1 | 1/2003 | Wegeng et al. | |
| 2003/0116016 A1 | 6/2003 | Monzyk et al. | |
| 2005/0045030 A1 | 3/2005 | Tonkovich et al. | |
| 2006/0075777 A1 | 4/2006 | Howard et al. | |
| 2006/0102519 A1 | 5/2006 | Tonkovich et al. | |
| 2006/0162556 A1 | 7/2006 | Ackley et al. | |
| 2006/0165574 A1 | 7/2006 | Sayari | |
| 2006/0210454 A1 | 9/2006 | Saxena et al. | |
| 2006/0249020 A1 | 11/2006 | Tonkovich et al. | |
| 2007/0085227 A1 | 4/2007 | Tonkovich et al. | |
| 2007/0240449 A1 | 10/2007 | Howard et al. | |
| 2007/0246106 A1 | 10/2007 | Tonkovich et al. | |
| 2008/0028286 A1 | 1/2008 | Chick | |
| 2008/0282884 A1 | 11/2008 | Kelley et al. | |
| 2008/0282885 A1 | 11/2008 | Deckman et al. | |
| 2008/0282886 A1 | 11/2008 | Reyes et al. | |
| 2008/0282887 A1 | 11/2008 | Chance et al. | |
| 2008/0282892 A1 | 11/2008 | Deckman et al. | |
| 2008/0314245 A1 | 12/2008 | Hershkowitz et al. | |
| 2009/0151562 A1 | 6/2009 | Russell et al. | |
| 2009/0211441 A1 | 8/2009 | Reyes et al. | |
| 2009/0217691 A1 | 9/2009 | Schmidt et al. | |
| 2009/0294348 A1 | 12/2009 | Krogue et al. | |
| 2009/0308248 A1 | 12/2009 | Siskin et al. | |
| 2009/0326279 A1 | 12/2009 | Tonkovich et al. | |
| 2010/0251887 A1 | 10/2010 | Jain | |
| 2010/0263534 A1 | 10/2010 | Chuang | |
| 2010/0326272 A1 | 12/2010 | Asaro et al. | |

FOREIGN PATENT DOCUMENTS

| | | |
|---|---|---|
| EP | 1080771 B1 | 10/2007 |
| JP | 2000317244 A | 11/2000 |
| JP | 2002326810 A | 11/2002 |
| WO | 92/05859 | 4/1992 |
| WO | 96/14917 | 5/1996 |
| WO | 02/087730 A2 | 11/2002 |
| WO | 2005/061100 A1 | 7/2005 |
| WO | 2008/000380 A1 | 1/2008 |
| WO | 2008/143826 A1 | 11/2008 |
| WO | 2008/143966 A1 | 11/2008 |
| WO | 2009/105251 A1 | 8/2009 |
| WO | 2010/064121 A8 | 6/2010 |
| WO | 2010/096916 A1 | 9/2010 |
| WO | 2010130787 A1 | 11/2010 |

OTHER PUBLICATIONS

Suib, Steven L., O'Young, Chi-Lin "Synthesis of Octahedral Molecular Sieves and Layered Materials", Marcel Dekker, Inc., vol. 69 (1997), pp. 215-231.

Zhao, Dongyuan, Feng, Jianglin, Huo, Qishing, Melosh, Nicholas, Fredrickson, Glenn H., Chmelka, Bradley F., Stucky, Galen D. "Triblock Copolymer Syntheses of Mesoporous Silica with Periodic 50 to 300 Angstrom Pores", Science, vol. 279 (Jan. 23, 1998), pp. 548-552.

Zamani, Cyrus, Illa, Xavi, Abdollahzadeh-Ghom, Sara, Morante, J. R., Rodriguez, Albert Romano "Mesoporous Silica: A Suitable Adsorbent for Amines", Nanoscale Res Lett, vol. 4 (2009), pp. 1303-1308.

Santos, Monica S., Grande, Carlos A., Rodrigues, Alirio E. "New cycle configuration to enhance performance of kinetic PSA processes", Chemical Engineering Science 66 (2011) pp. 1590-1599.

Rezaei F. et al.: "Structured absorbents in gas separation processes". Separation and Purification Technology, Elsevier Science, Amsterdam, NL, vol. 70, No. 3, Jan. 12, 2012, pp. 243-256, ISSN: 1383-5866.

The International Search Report of PCT/US2012/026753 dated Aug. 8, 2012.

The International Search Report and Written Opinion of PCT/US2012/026745 dated Sep. 17, 2012.

* cited by examiner

INCREASING SCALES, CAPACITIES, AND/OR EFFICIENCIES IN SWING ADSORPTION PROCESSES WITH HYDROCARBON GAS FEEDS

FIELD OF THE INVENTION

This invention relates to improvements in swing adsorption processes using a solid adsorbent material and more particularly to improvements in rapid cycle pressure and/or temperature swing adsorption processes to use the solid adsorbent material in a smaller amount and/or more efficiently.

BACKGROUND OF THE INVENTION

Natural gas from many gas fields, which is often produced at high pressures, possibly as high as 50 MPa, can contain significant levels of $H_2O$, $H_2S$, $CO_2$, $N_2$, mercaptans, and/or heavy hydrocarbons that have to be removed to various degrees before the gas can be transported to market. It is preferred that as much of the acid gases $H_2S$ and $CO_2$ be removed from natural gas as possible to leave methane as the recovered component. Small increases in recovery of this light component can result in significant improvements in process economics and also serve to prevent unwanted resource loss, It is desirable to recover more than 80 vol %, preferably more than 90 vol %, of the methane when detrimental impurities are removed. In many instances effective removal of the $H_2S$ is more important than $CO_2$ removal as specifications for natural gas transmission pipelines typically limit the $H_2S$ content to be as low as 4 vppm while a more relaxed specification of two to three percent is typically permissible for $CO_2$. If the contaminant removal process is unselective between these two gases or favorable to $CO_2$ removal, the treatment will be unnecessarily severe, resulting in increased processing costs. A natural gas treatment process which is selective for $H_2S$ relative to $CO_2$ is therefore economically attractive.

Natural gas treating is often carried out using solid sorbents such as activated charcoal, silica gel, activated alumina, or various zeolites. The well-established pressure swing adsorption (PSA) process has been used in this way since about the 1960s. In the PSA process, the solid sorbent is contained in a vessel and adsorbs the contaminant gas species at high pressure and When the design sorption capacity of the sorbent is attained the gas stream is switched to another sorption vessel while the pressure in the first vessel is reduced to desorb the adsorbent component. A stripping step with inert (non-reactive) as or with treated product gas may then follow before the vessel is returned to the sorption portion of the cycle. Variants of the conventional PSA (cPSA) process have been developed including the partial pressure swing or displacement purge adsorption (PPSA), rapid cycle pressure swing adsorption (RCPSA), Dual Bed (or Duplex) PSA Process, and rapid cycle partial pressure swing or displacement purge adsorption (RCPPSA) technologies.

Temperature swing adsorption (TSA) provides an alternative to the pressure swing technology in which the sorbed component is desorbed by an increase in temperature typically achieved by the admission of high temperature gas, e.g., air, to the vessel in the regeneration phase, Rapid cycle thermal swing adsorption (RCTSA) is a variant of the conventional TSA process using short cycles, typically less than two minutes. TSA processes are generally available commercially from a number of technology suppliers, although the state of the art for large scale rapid cycle TSA units is considerably less advanced. Large scale slow (~10 hr) cycle internally heated TSA's have been used in natural gas processing for rigorous dehydration and mercaptan removal. In an internally heated thermal swing adsorption process, the gas or fluid used to heat the contactor directly contacts the adsorbent material. As such, the gas or fluid used to heat the contactor during regeneration can pass through the same channels that the feed gas does during the adsorption step. Externally heated thermal swing adsorption processes employ contactors having a separate set of channels to carry gases or fluids used to heat and cool the contactor so that gases used to heat and cool the contactor do not mix with the adsorbent that contacts the feed gas.

Indeed, adsorptive separation may be achieved, as noted by Yang by three mechanisms, steric, equilibrium, or kinetic: R. T. Yang *Gas Separation by Adsorption Processes*, Imperial College Press, 1997, ISBN: 1860940471, ISBN-13: 9781860940477. A large majority of processes operate through the equilibrium adsorption of the gas mixture and kinetic separations have lately attracted considerable attention with the development of functional microporous adsorbents and efficient modeling tools. Relatively few steric separation processes have been commercialized. Kinetically based separation involves differences in the diffusion rates of different components of the gas mixture and allows different species to be separated regardless of similar equilibrium adsorption parameters. Kinetic separations utilize molecular sieves as the adsorbent since they exhibit a distribution of pore sizes which allow the different gaseous species to diffuse into the adsorbent at different rates while avoiding exclusion of any component of the mixture. Kinetic separations can be used for the separation of industrial gases, for example, for the separation of nitrogen from air and argon from other gases. In the case of the nitrogen/oxygen separation (for example, oxygen and nitrogen differ in size by only 0.02 nm), the separation is efficient since the rate of transport of oxygen into the carbon sieve pore structure is markedly higher than that of nitrogen. Hence, the kinetic separation works, even though the equilibrium loading levels of oxygen and nitrogen are virtually identical.

Kinetically based separation processes may be operated, as noted in U.S. Patent Application Publication No. 2008/0282884, as pressure swing adsorption (PSA), temperature swing adsorption (TSA), partial pressure swing or displacement purge adsorption (PPSA) or as hybrid processes comprised of components of several of these processes. These swing adsorption processes can be conducted with rapid cycles, in which case they are referred to as rapid cycle thermal swing adsorption (RCTSA), rapid cycle pressure swing adsorption (RCPSA), and rapid cycle partial pressure swing or displacement purge adsorption (RCPPSA) technologies, with the term "swing adsorption" taken to include all of these processes and combinations of them.

In the case of kinetic-controlled PSA processes, the adsorption and desorption are more typically caused by cyclic pressure variation, whereas in the case of TSA, PPSA and hybrid processes, adsorption and desorption may be caused by cyclic variations in temperature, partial pressure, or combinations of pressure, temperature and partial pressure, respectively. In the exemplary case of PSA, kinetic-controlled selectivity may be determined primarily by micropore mass transfer resistance (e.g., diffusion within adsorbent particles or crystals) and/or by surface resistance (e.g., narrowed micropore entrances). For successful operation of the process, a relatively and usefully large working uptake (e.g., the amount adsorbed and desorbed during each cycle) of the first component and a relatively small working uptake of the second component may preferably be achieved. Hence, the kinetic-controlled PSA process requires operation at a suitable cyclic frequency, balancing the avoidance of excessively high cycle frequency where the first component cannot achieve a useful working uptake with excessively low frequency where both components approach equilibrium adsorption values.

Some established kinetic-controlled PSA processes use carbon molecular sieve adsorbents, e.g., for air separation with oxygen comprising the first more-adsorbed component and nitrogen the second less adsorbed component. Another example of kinetic-controlled PSA is the separation of nitrogen as the first component from methane as the second component, which may be performed over carbon molecular sieve adsorbents or more recently as a hybrid kinetic/equilibrium PSA separation (principally kinetically based, but requiring thermal regeneration periodically due to partial equilibrium adsorption of methane on the adsorbent material) over titanosilicate based adsorbents such as ETS-4 (such as disclosed in U.S. Pat. Nos. 6,197,092 and 6,315,817).

The faster the beds perform the steps required to complete a cycle, the smaller the beds can be when used to process a given hourly feed gas flow. Several other approaches to reducing cycle time in PSA processes have emerged which use rotary valve technologies as disclosed in U.S. Pat. Nos. 4,801,308; 4,816,121; 4,968,329; 5,082,473; 5,256,172; 6,051,050; 6,063,161; 6,406,523; 6,629,525; 6,651,658; and 6,691,702. A parallel channel (or parallel passage) contactor with a structured adsorbent may be used to allow for efficient mass transfer in these rapid cycle pressure swing adsorption processes. Approaches to constructing parallel passage contactors with structured adsorbents have been disclosed such as in U.S. Patent Application Publication No. 2008/0282892.

Traditionally, adsorptive separation processes use packed beds of adsorbent particulates. However, the traditional packed beds are not likely to meet the very stringent requirements for natural gas cleanup. The use of adsorbent monoliths provides one approach to designing an adsorbent bed that has low pressure drop, good flow distribution, and low dispersion. Monoliths have very low flow tortuosity and can also be engineered for almost any user specified void volume to meet a specified pressure drop. Other monolith advantages include avoidance of bed fluidization or lifting. While offering these advantages, the monoliths can also have some disadvantages. These include, (i) lack of lateral flow communication between axial flow channels which prevents self correction of any flow maldistribution, (ii) a likely more pronounced effect of obstructive fouling on flow distribution, (iii) potential thermal and mechanical stresses during pressure and thermal cycling, (iv) wall effects leading to flow leakage near the wall, (v) difficult and expensive to manufacture, (vi) difficult to apply a consistent and mechanically stable adsorbent coating within the monolith channels, and (vii) difficult loading/unloading of the monolith in the containment vessel (as compared to loose particle beds) leading to a longer turnaround time.

Other gas streams containing similar contaminants are encountered in various industrial processes, notably in petroleum refining and in petrochemical processes. In petroleum refining, for example, hydrodesulfurization processes utilize separation processes which remove the hydrogen sulfide formed in the process from the circulating stream of hydrogen. Conventionally, amine scrubbers are used for this purpose, using liquid amine sorbents such as monoethanolamine (MBA), diethanolamine (DEA), triethanolamine (TEA), methyldiethanolamine (MDEA), and diisopropylamine (DTPA) in the form of an aqueous solution.

Conventionally, liquid sorbent systems such as used in hydrogen sulfide scrubbing operate on a closed cycle with separate sorption and regeneration vessels through which the liquid sorbent is continuously circulated in a sorption-regeneration loop in which the sorption is typically carried out at a temperature optimized for sorption of the contaminant and the regeneration carried out by stripping, usually by steam at a higher temperature, in the regeneration tower. Inert gas stripping is also potentially useful to remove the sorbed contaminant species.

The capture of $CO_2$ by amine species takes place through the formation of carbamate salts for primary and secondary amines, and additionally through the formation of ammonium bicarbonate salts when water is present. When tertiary amities are utilized with water present the formation of carbamate salts which require a proton transfer cannot take place and the reactions are limited to the formation of bicarbonate salts in a reaction sequence which with requires $H_2O$ to be present. In the absence of water, tertiary and other non-protogenic basic nitrogen species do not react with $CO_2$, as no bicarbonate formation is possible. Hydrogen sulfide ($H_2S$) is a Brønsted acid, and it reacts with all sufficiently basic amine species, including tertiary or non-protogenic amines, amidines, guanidines, and biguanides through simple acid/base reactions by the transfer of a proton from the $H_2S$ to the amine species to form ammonium sulfide (trisubstituted ammonium sulfide salts in the case of tertiary amines) reversibly, both in the presence and absence of water.

Current commercial RCPSA machinery can typically use a rotary module with two interfaces that bound the two ends of substantially parallel-sided adsorbent forms (e.g., tubes/cylinders), in which the interfaces have roughly the same cross-sectional area and shape. Such rotary modules typically occupy a relatively large volume, which can be a problem for volume-limited applications, such as floating- and/or platform-based separation/sequestration of carbon dioxide from natural gas. Nevertheless, typically only about 5-8 million standard cubic feet per day (MSCFD) of gas feed flow can be processed in a single commercial rotary module having a rotor diameter and/or sorption material diameter of approximately 3.5-4 feet (about 1 meter). Therefore, for swing applications processes requiring treatment of higher flows and/or for purification into more concentrated products from more dilute feedstreams, e.g., about 100-200 MSCFD or even higher, a very large number of these commercial modules would need to be utilized and integrated. When integrating the number of straight-walled adsorbent forms necessary for such high flow/throughput applications, volume limitations can often make such integration extremely difficult, or maybe impossible. While the volume-limited, high-throughput issue has been illustrated using a pressure swing example, it should be understood that temperature swing and/or mixed pressure and temperature swing processes should generally experience similar issues.

Alternately, instead of integrating a relatively large number of lower-capacity commercial rotary modules to attain higher gas throughput, one might simply scale up a single rotary module to achieve the 12- to 40- fold (or higher) increase in capacity. Because adsorption capacity typically scale with volume, a doubling in apparatus (valve) size can ideally effect an 8-fold increase in capacity, though this scaling does not necessarily apply to flow rates/fluxes, As the commercial rotary module valve diameters are already typically about four feet, the mechanical aspects of increasing diameter by 100% (or more) may not be trivial and may cause additional, previously-unrecognized issues.

Further, parallel-sided adsorbent modules may not offer the best per gram adsorptive efficiency, due to the lower need for sorption volume at the product end of the module as compared to the feed end. In such a situation, it may be desirable to seek to increase the per gram adsorptive efficiency of the adsorbent material by altering the shape of the adsorbent module(s), such that the cross-sectional area at the product end is smaller than the cross-sectional area at the feed end of the module(s), and/or such that the adsorbent module(s each) has(have) sides that are not parallel but that are at an angle so as to converge/intersect (though generally the convergence/intersection would be at a theoretical position past the product end of the module(s)). Additionally or alternately, in situations where rotary valved non-parallel-sided adsorbent modules There is, therefore, a need to increase capacity, or at least the efficiency, of each single swing adsorption module to reduce cost, to make the technology applicable to larger scale applications, and/or to address apparatus volume issues perhaps unique to volume-limited applications.

SUMMARY OF THE INVENTION

One aspect of the present invention relates to an increased efficiency high-capacity swing adsorption process comprising: providing a feedstream containing a first concentration of at least one desired product gas and a first concentration of at least one contaminant gas, wherein the feedstream is provided at a rate of more than 75 million standard cubic feet per day (MSCFD) (e.g., at least 100 MSCFD, at least 125 MSCFD, at least 150 MSCFD, at least 175 MSCFD, at least 200 MSCFD, at least 250 MSCFD, at least 300 MSCFD, at least 400 MSCFD, at least 500 MSCFD, at least 750 MSCFD, at least 1 billion standard cubic feet per day (BSCFD), or at least 2 BSCFD); contacting the feedstream with an adsorption module having a feed end, a product end, and one or more adsorption beds comprising an adsorption material under conditions sufficient for the adsorption material to selectively adsorb the at least one desired product gas in comparison to the at least one contaminant gas, so as to form a contaminant effluent having a second concentration of the at least one desired product gas that is lower than the first concentration in the feedstream and having a second concentration of the at least one contaminant gas that is higher than the first concentration in the feedstream; and selectively desorbing the at least one desired product gas from the adsorption material, so as to form a product effluent having a third concentration of the at least one desired product gas that is at least 15 wt % (e.g., at least 20 wt %, at least 25 wt %, at least 30 wt %, at least 35 wt %, at least 40 wt %, at least 45 wt %, at least 50 wt %, at least 55 wt %, at least 60 wt %, at least 65 wt %, at least 70 wt %, at least 75 wt %, at least 80 wt %, or at least 85 wt %) higher than the first concentration in the feedstream and having a second concentration of the at least one contaminant gas that is at least 15 wt % (e.g., at least 20 wt %, at least 25 wt %, at least 30 wt %, at least 35 wt %, at least 40 wt %, at least 45 wt %, at least 50 wt %, at least 55 wt %, at least 60 wt %, at least 65 wt %, at least 70 wt %, at least 75 wt %, at least 80 wt %, or at least 85 wt %) lower than the first concentration in the feedstream, wherein the adsorption module contains rotary valves both on the feed end and on the product end of the adsorption bed(s) and a rotational member defining a central rotational axis;

wherein the adsorption bed(s) is(are) oriented circumferentially to the rotational member axially surrounding the rotational axis; and wherein one or more of the following are true: (i) the adsorption bed(s) thus (each) comprise an inner wall closest to the rotational axis and an outer wall furthest from the rotational axis, such that the outer wall defines a plane that is non-parallel with a plane defined by the inner wall, such that an intersection angle defined at the convergent interface of the planes is between 10° and 60° (e.g., between 15° and 55°, between 20° and 50°, or between 30° and 45°); (ii) the adsorption bed(s) thus (each) comprise a feed end cross-sectional area and a product end cross-sectional area, such that a ratio of the feed end cross-sectional area to the product end cross-sectional area is from 1.2 to 10 (e.g., from 1.3 to 8, from to 6, from 1.7 to 5, or from 2 to 4); and (iii) the feed end rotary valve has a diameter and the product end rotary valve has a diameter, such that the ratio of the feed end rotary valve diameter to the product end rotary valve diameter is from 1.1 to 2.5 (e.g., from 1.2 to 2.3, from 1.3 to 2.1, from 1.4 to 2, or from 1.5 to 1.9).

In an alternate aspect of the invention, the adsorbent material can selectively adsorb the at least one contaminant gas instead of the at least one desired product gas, such that the increased efficiency high-capacity swing adsorption process can comprise: providing a feedstream containing a first concentration of at least one desired product gas and a first concentration of at least one contaminant gas, wherein the feedstream is provided at a rate of more than 75 million standard cubic feet per day (MSCFD) (e.g., at least 100 MSCFD, at least 125 MSCFD, at least 150 MSCFD, at least 175 MSCFD, at least 200 MSCFD, at least 250 MSCFD, at least 300 MSCFD, at least 400 MSCFD, at least 500 MSCFD, at least 750 MSCFD, at least 1 billion standard cubic feet per day (BSCFD), or at least 2 BSCFD); contacting the feedstream with an adsorption module having a feed end, a product end, and one or more adsorption beds comprising an adsorption material under conditions sufficient for the adsorption material to selectively adsorb the at least one contaminant gas in comparison to the at least one desired product gas, so as to form a product effluent having a second concentration of the at least one desired product gas that is at least 15 wt % (e.g., at least 20 wt %, at least 25 wt %, at least 30 wt %, at least 35 wt %, at least 40 wt %, at least 45 wt %, at least 50 wt %, at least 55 wt %, at least 60 wt %, at least 65 wt %, at least 70 wt %, at least 75 wt %, at least 80 wt %, or at least 85 wt %) higher than the first concentration in the feedstream and having a second concentration of the at least contaminant gas that is at least 15 wt % (e.g., at least 20 wt %, at least 25 wt %, at least 30 wt %, at least 35 wt %, at least 40 wt %, at least 45 wt %, at least 50 wt %, at least 55 wt %, at least 60 wt %, at least 65 wt %, at least 70 wt %, at least 75 wt %, at least 80 wt %, or at least 85 wt %) lower than the first concentration in the feedstream; and selectively desorbing the at least one contaminant gas from the adsorption material, so as to form a product effluent having a third concentration of the at least one desired product gas that is lower than the first concentration in the feedstream and having a second concentration of the at least one contaminant gas that is higher than the first concentration in the feedstream, wherein the adsorption module contains rotary valves both on the feed end and on the product end of the adsorption bed(s) and a rotational member defining a central rotational axis; wherein the adsorption bed(s) is(are) oriented circumferentially to the rotational member axially surrounding the rotational axis; and wherein one or more of the following are true: (i) the adsorption bed(s) thus (each) comprise an inner wall closest to the rotational axis and an outer wall furthest from the rotational axis, such that the outer wall defines a plane that is non-parallel with a plane defined by the inner wall, such that an intersection angle defined at the convergent interface of the planes is between 10° and 60° (e.g., between 15° and 55°, between 20° and 50°, or between 30° and 45°); (ii) the adsorption bed(s) thus (each) comprise a feed end cross-sectional area and a product end cross-sectional area, such that a ratio of the feed end cross-sectional area to the product end cross-sectional area is from 1.2 to 10 (e.g., from L3 to 8, from 1.5 to 6, from 1.7 to 5. or from 2 to 4); and (iii) the feed end rotary valve has a diameter and the product end rotary valve has a diameter, such that the ratio of the feed end rotary valve diameter to the product end rotary valve diameter is from 1.1 to 2.5 (e.g., from 1.2 to 2.3, from 1.3 to 2.1, from 1.4 to 2, or from 1.5 to 1.9).

BRIEF DESCRIPTION OF THE DRAWINGS

FIG. 1 shows various views of a rotary valved adsorption module according to the invention. FIG. 1a shows the module in a standard (feed end down) configuration, while

DETAILED DESCRIPTION OF THE EMBODIMENTS

General Considerations

For any details regarding gas sorption/purification processes, gas feedstocks, particulate/monolithic sorbents, enriched products, gas recycle streams, process flow schemes, apparatuses, integration with oil and/or gas production processes, and concepts relating thereto, please note the relevant disclosures in U.S. Ser. Nos. 61/447,806, 61/447,812, 61/447,824, 61/447,835, 61/447,848, 61/447,869, 61/447,877, 61/448,117, 61/448,120, 61/448,121, 61/448,123, and 61/448,125, each filed Mar. 1, 2011, U.S. Ser. No. 61/594,824 filed Feb. 3, 2012, and the U.S. patent application entitled "Apparatus and Systems having a Rotary Valve Assembly and Swing Adsorption Processes Related Thereto" by Robert F. Tammera et al. filed on Mar. 1, 2012, as well as the U.S. non-provisional applications claiming priority to any of these applications, each of which is incorporated by reference herein in its entirety.

Though much discussion centers herein on separation/purification of $CO_2$ from refinery (e.g., flue) gas feedstreams, and/or on removal of acid gas, nitrogen-containing impurities, sulfur-containing impurities, and/or other undesirable impurities from hydrocarbon-containing (e.g., natural) gas feedstreams, it is contemplated herein that the processes, apparatuses, and systems disclosed herein can additionally or alternately be applicable in one or more of the following applications: carbon dioxide capture/sequestration in standard, arctic, and/or off-shore gas and/or oil production, including shale gas production, shale oil production, and the like; air separation processes (e.g., separating oxygen from nitrogen), as alternative to cryogenic processes, for instance for use in oxyfuel refinery processes; and/or for large scale (e.g., 75-150 MSCFD or higher) hydrogen purification processes, typically for refinery hydrotreatment processes but optionally also for syngas and/or power generation applications.

Though the rotary valve adsorption modules described herein are exemplified as modified cylindrical modules having a rotational member rotating around a central rotational axis, to which rotational member is attached a unitary annular (array of) adsorption bed(s) that rotates with the rotational member against both the feed end and the product end rotary valves, it should be understood that variations on this simplistic theme may be made and still be within the scope of the present invention. For instance, one or more of the rotary valve adsorption modules according to the invention can be a multi-annular module with a more complex rotational engagement, e.g., such as described in U.S. Pat. No 7,250,150, the entire contents of which are hereby incorporated by reference.

In one embodiment of the process according to the invention, the feedstream can comprise or be natural gas, the at least one desired product gas can comprise or be $CH_4$, and the at least one contaminant gas can comprise or be $CO_2$, $H_2S$, $NO_x$, $SO_x$, or a combination thereof. In another embodiment of the process according to the invention, the feedstream can comprise a refinery flue gas, the at least one desired product gas can comprise $CO_2$, and the at least one contaminant gas can comprise $N_2$, $H_2S$, $NO_x$, $SO_x$, or a combination thereof. In still another embodiment of the process according to the invention, the feedstream can comprise air, the at least one desired product gas can comprise $N_2$, and the at least one contaminant gas can comprise $O_2$. Alternately, the feedstream can comprise air, the at least one desired product gas can comprise $O_2$, and the at least one contaminant gas can comprise $N_2$. In yet another embodiment of the process according to the invention, the feedstream can comprise a hydrocarbon conversion product stream or a chemical plant product or waste stream, the at least one desired product gas can comprise an olefin (e.g., ethylene, propylene, 1-butene, 2-butene, isobutylene, or the like, or a combination thereof), and the at least one contaminant gas can comprise a saturated hydrocarbon (e.g., methane, ethane, propane, butane, cyclobutane, pentane, cyclopentane, or the like, or a combination thereof), a diolefin (e.g., 1,3-butadiene, 1,3-pentadiene, 1,4-pentadiene, or the like, or a combination thereof), and/or an optionally heteroatom-containing hydrocarbon material having a triple bond (e.g., acetylene, acrylonitrile, or the like, or a combination thereof). In a yet still further embodiment of the process according to the invention, the separation process can be used to remove contaminants from feedstreams for (ultra) purification applications, e.g., where extremely high (for example at least 99.9 wt %, at least 99.99 wt %, or higher) desired product gas purity and/or extremely low (for example not more than 1000 wppm, not more than 500 wppm, not more than 100 wppm, or lower) contaminant gas concentration is required, such as for semiconductor manufacture and/or cleaning.

Adsorbent

The adsorbent material can be comprised of uncoated adsorbent particles, coated adsorbent particles, or a monolithic adsorbent, which may itself be made from an agglomeration or packing of such adsorbent particles. For coated adsorbent particles, it can be preferred to have an adsorbent layer of relatively uniform thickness on the adsorbent material (particles). The preferred thickness of the adsorbent layer can be set by the mass transfer coefficients, as well as the time of the key steps in the swing adsorption process (e.g., adsorption and desorption steps). Calculation of these mass transfer rate constants is well known to those having ordinary skill in the art and may additionally or alternately be derived by those having ordinary skill in the art from standard testing data. D. M. Ruthven & C. Thaeron, "Performance of a Parallel Passage Absorbent Contactor," *Separation and Purification Technology*, 12 (1997), 43-60, which is incorporated herein by reference, discloses many aspects of how the mass transfer can be affected by the thickness of the adsorbent, channel gap, and cycle time of the process. Also, U.S. Pat. No. 6,607,584, which is also incorporated by reference herein, describes the details for calculating these transfer rates and associated coefficients for a given adsorbent and the test standard compositions used for conventional PSA.

Thickness can advantageously be taken to refer to the average thickness of the adsorbent. The thickness uniformity can be assessed from measurements of the thickness of the adsorbent and/or from the way in which it is fabricated. It can be preferred in many embodiments that the thickness uniformity of the adsorbent be such that the standard deviation of its thickness is less than about 40% of the average thickness, e.g., less than about 15% or less than about 5%.

In one embodiment, the coated adsorbent particles can be assembled into an ordered structure which to a degree can approach the functionality of a monolith without some or all of its attendant disadvantages. As noted above, conventional monolith adsorbents have their own characteristic advantages and disadvantages, one of which is that it is difficult to form a thin and reliably uniform wash coating of adsorbent on the support, especially if the monolith has pores of relatively small diameter when the coating solution may clog the pore entrances and preclude further ingress of coating material. In this case, the adsorption characteristics of the monolith are likely to be unpredictable and less than optimal. To overcome this drawback, while retaining advantages of the monolith to a certain extent, including its low tortuosity and predictable void volume, the present particulate adsorbents can preferably be formed into a simulated monolith by laying down a layer of the adsorbent material on the surfaces of the particles and then assembling the particles into the adsorbent bed, e.g., either by packing directly into the sorption vessel in a densely packed bed or, more preferably, by forming the coated structured adsorbent particles into shaped structures which can then be packed into the vessel in the form of blocks. similarly to blocks of monolith. In effect, the conventional method of monolith fabrication can be inverted and the adsorbent coated onto the outside of the support particles and the monolith-like structure then assembled from the coated particles. In this way, not only can a more uniform coating of the essential adsorbent be achieved but the pore structure of the simulated monolith can be controlled by using particles of different shapes and surface roughness. When operating in this manner, the adsorbent particles should have a ratio of length to maximum cross-sectional dimension ratio of at least 2:1, preferably at least 5:1, and a maximum cross-sectional dimension typically not more than 5 mm, for example not more than 1 mm. After the particles are laid down in the ordered configuration with longitudinally extensive, substantially aligned gas channels, the particles can then be bundled/adhered together in the mass to form a coherent, self-supporting body. The masses can then be placed in the vessel with the gas passages aligned in the desired orientation to form an ordered adsorbent bed.

If it is desired to have an ordered arrangement of the particles with longitudinal gas passages aligned with each other to permit access of the gases to the adsorbent coating substantially along the lengths of the particles and over the maximum area available for gaseous diffusion, the particles can preferably be formed with a relatively high aspect ratio of length to the maximum cross-sectional dimension, e.g., of at least 2:1, such as at least 3:1, at least 5:1, at least 10:1, or at least 20:1, with the maximum ratio potentially as high as the structural strength of the core material might permit without leading to excess breakage or attrition of the particles during loading, packing (as described below), or in use. Particles of this configuration can generally be described as cylinders or polygonal prisms with various cross-sections such as square, rectangular, pentagonal, hexagonal, octagonal, or as polylobar extrudates, (e.g., trilobe, quadlobe, or the like). Additionally, or alternately, the particles may be hollow with a central gas passage which itself may be coated with the adsorbent along with the external surfaces of the particle. Longitudinal grooves may be provided in the shape so as to provide additional gas channels or passages along the exterior of the particles. Hollow particles and grooved particles should typically have a minimum wall thickness adequate to confer the desired crush strength to the particles.

The adsorbent material coated onto the core particles can be selected according to the service needs, particularly the composition of the incoming gas stream, the contaminants which are to be removed and the desired service conditions, e.g., incoming gas pressure and temperature, desired product composition and pressure. Non-limiting examples of selective adsorbent materials can include, but are not limited to, microporous materials such as zeolites, metal organic frameworks, AlPOs, SAPOs, ZIFs, (Zeolitic Imidazolate Framework based molecular sieves, such as ZIP-7, ZIF-8, ZIF-22, etc.), and carbons, as well as mesoporous materials such as amine-functionalized MCM materials, and combinations and intergrowths thereof. For the acidic gases, such as hydrogen sulfide and carbon dioxide, typically found in natural gas streams, adsorbent such as cationic zeolites, amine-functionalized mesoporous materials, stannosilicates, carbons, and combinations/intergrowths thereof can be suitable.

The adsorbent coating can be in the form of individual particles (such as zeolite crystals) bound together to form a coating, a mixed matrix film containing the adsorbent particles, a porous layer having a sorbent (absorbent or adsorbent) in the pore structure, or a reasonably contiguous film of adsorbent material, as well as a combination of these structures. Non-limiting examples of mixed matrix films can include, but are not limited to, polymer films such as silicone rubber, polyimide films containing particles of zeolites such as DDR, CHA, MFI, Beta, FAU, and/or combinations or intergrowths thereof, and the like, Mixed matrix films on the exterior of the core can additionally or alternately contain pore/void structures. Examples of void structures can include voids between the polymer adsorbent particles, while pore structures can typically comprise interconnected pore networks. Examples of reasonably contiguous films of adsorbent materials can include crystalline adsorbent materials that are intergrown to form a film of adsorbent crystals, films of amorphous adsorbent materials, and the like. Intergrown films of adsorbent crystals can include zeolite films of DDR, MFI, and/or CHA grown on the exterior surface of the core, These films can additionally or alternatively contain voids/pore networks. Examples of a porous layer having an adsorbent in the pore structure can include porous alumina with an ionic liquid imbibed into the pore structure. Examples of a porous layer having an adsorbent in the pore structure can include porous alumina with small zeolite particles packed/bound into the pore structure.

Examples of suitable coating methods can include fluid phase coating techniques, such as slurry coating, slip coating, hydrothermal film formation, hydrothermal coating conversion, and hydrothermal growth, When non-hydrothermal coating techniques are used, the coating solutions can typically include the adsorbent and a viscosifying agent, such as polyvinyl alcohol, and optionally a heat transfer solid and a binder. The heat transfer solid may not be needed in situations where the core of the particle can act as its own heat sink, e.g., by storing and releasing heat in the different steps of the separation process cycle. If a viscosifying agent, such as polyvinyl alcohol, is used, it can usually burn away when the coating is cured, e.g., in a kiln, Binders such as colloidal silica and/or alumina may be used to increase the mechanical strength of the fired coating. lithe adsorbent includes a microporous, mesoporous, and/or macroporous component, this can typically occupy from about 20 to about 60% (e.g., from about 20% to about 40%) of the volume of the cured coating, To reduce the void volume of coatings containing such components, a blocking agent can be applied in a separate coating process. When hydrothermal film formation methods are chosen to apply the adsorbent layer, the coating techniques used can be very similar to the way in which zeolite membranes are prepared, An example of a method for growing a zeolite layer is described in U.S. Pat. No. 7,049,259, to which specific reference is made herein for incorporation of a description of such a method, Zeolite layers grown by hydrothermal synthesis on supports can often have cracks and grain boundaries that are mesoporous and/or macroporous in size. The volume of these pores can often be less than about 10 vol % of the film thickness, and there can often be a characteristic distance, or gap, between cracks. Thus, as-grown films can often be used directly as an adsorbent layer without the need for a blocking agent, When the adsorbent coating is in the form of individual bound particles, the particles of the adsorbent material may be coated onto the core particles from a liquid e.g., a suspension or solution, and/or can be adhered to the particles, e.g., by physical attraction. One method for preparing a coating of individual bound particles can be to wash coat the particles onto the core. The wash coat can include binder particles that do not act as adsorbents.

When the adsorbent coating is a mixed matrix film containing adsorbent particles, it can be deposited on the cores from a slurry containing a solvent, polymer, and zeolite(s) can be coated onto the surface of the core in a variety of fluid bed, and spray drying and extrusion processes. In these processes the solvent can advantageously evaporate, leaving the mixed matrix polymer and zeolite film.

If the structured adsorbent is a porous layer having an adsorbent in the pore structure, a porous inorganic oxide film can be formed on the surface of the core, and an adsorbent liquid can be imbibed into the pore structure and/or adsorbent particles can be packed/coated into the pore structure. In imbibing situations, it can be preferred for the oxide film to be chosen so that the liquid film readily invades (i.e., wets the inside of) the pore structure. It can additionally or alternatively be preferred that that the size of the pore structure can be selected to hold the liquid in place by capillary action.

In coating/packing situations, coating techniques such as dry powered coating, slurry casting, and/or wash coating can be used to place adsorbent particles in the pore structure.

When the adsorbent is an intergrown film of adsorbent crystals, the coating can be produced by hydrothermal and/or solvothermal synthesis. For example, films of intergrown DDR (as well as MFI) crystals can readily be produced by hydrothermal synthesis. When the adsorbent is a film of an amorphous adsorbent material, it may be solution coated onto the core and/or formed on the core by a chemical reaction.

The core material may be porous or non-porous, as long as the low permeability requirement is met for rapid cycle operation. Non-porous solid materials can be preferred for certain kinetically-controlled processes, since the diffusion path in such processes can be more limited, although at the expense of a reduced surface area so that, although the faster cycles correlated with shorter diffusion paths can be achieved, the total sorption capacity may be reduced. If a low permeability porous solid is used, it may be a conventional porous support, such as a metal(loid) oxide or mixed oxide such as alumina, silica, and silica-alumina, or a zeolite, as well as a silica having pore structure in the microporous size range. Because of the desirability of keeping the permeability relatively low, mesoporous and macroporous materials are not likely to be preferred, though they may be used to form the adsorbent layer on the core. Silica gels can be a preferred source of porous cores, since they may be obtained commercially with a range of pore sizes and permeabilities and can be suitable for forming into particles by conventional extrusion techniques.

Non-porous particle cores may be made of any suitable material, such as metal, glass, ceramic, plastic, or the like, and may be mass manufactured by extrusion, molding, or an appropriate process based on the material, Cores can be hollow shells/spheres such as microballoons (microspheres) of glass/ceramics. Cores can additionally or alternately be porous particles whose centermost portion can contains a filler such as a polymer. An additional benefit of the core structure can occur when the core material can be selected to enhance the strength of the particles. Thus, should the coating form cracks due to thermal or other stresses, the overall particle structure could be maintained. Additionally, mechanical or thermal cracks that may occur in the adsorbent layers of the embodiments herein can advantageously be limited to within each individual particle alone, in contrast to cracks or failures of adsorbent layers in monoliths that can result in significant bypassing/failure of large sections of the monolithic adsorbent layers.

Since a major function of the core can be to act as a heat sink, the thermal conductivity and thermal capacity of the core material should generally be selected in accordance with the size of the particles. Particles at the larger end of the size range can preferably have a relatively higher thermal conductivity than smaller particles, since the thermal diffusion path in the smaller particles can be limited and/or the heat transfer into and out of the particle during the cycle may not result in an accumulation of heat within the particle, even with relatively short cycle times. A related consideration here is that the size of the particles can affect the void volume; although the void ratio is not necessarily affected by changing particle size, typically mostly/only by particle geometry, the larger gas passages between the particles resulting from larger particle size may not be as favorable to fast cycle operation, since gas/particle contact can be decreased as inter-particle volume increases with the cube of linear dimension, while surface area of the particles increases only with its square. Thus, a balance can advantageously be achieved between the thermodynamics of the selected adsorption process, the desired cycle time, and the particle dimensions.

In one embodiment, the sorbent material can be a basic, non-protogenic nitrogenous compound. Compounds of this type typically do not, as described above, enter into chemisorption reactions with $CO_2$ in the absence of water, although they do typically undergo reaction with $H_2S$. This differential chemical reactivity can be used to selectively separate between the sorbed $H_2S$ and $CO_2$. The sorbent may be used in liquid form but can generally be used on a porous solid support.

A wide variety of basic nitrogen-containing compounds may be used as the essential sorbent. If desired, a combination of such compounds may be used. The requirement for the desired selectivity for $H_2S$ adsorption is that the nitrogenous groups be non-protogenic (i.e., incapable of acting as a proton donor). Such nitrogenous groups therefore cannot contain an acidic, dissociable hydrogen atom (such as a primary or secondary amine), which is a prerequisite for the formation of carbamates as a route for the CO2 chemisorption reaction in the absence of water. It is not generally required that the whole compound be aprotic (though it may), but only that the nitrogen-containing groups in the compound be non-protogenic. Non-protogenic nitrogen species are also typically non-nucleophilic under prevailing reaction conditions. Suitable nitrogenous compounds can include, but are not necessarily limited to, tertiary amines such as triethylamine, triethanolamine (TEA), methyldiethanolamine (MDEA), N,N,N',N'-tetrakis(2-hydroxyethyl)ethylenediamine, as well as non-protogenic nitrogenous bases with cyclic, multicyclic, and acyclic structures, such as imines, heterocyclic imines and amines, amidines (carboxamidines)such as dimethylamidine, guanidines, triazabicyclodecenes, imidazolines, and pyrimidines. Other compounds that can additionally or alternately be used can include the N,N-di(lower alkyl)carboxamidines (where lower alkyl is preferably $C_1$-$C_6$ alkyl), N-methyltetrahydropyrimidine (MTHP), 1,8-diazabicyclo[5.4.0]undec-7-ene (DBU), 1,5,7-triazabicyclo[4.4.0]dec-5-ene (TBD), 7-methyl-1,5,7-triazabicyclo[4.40]dec-5-ene (MTBD), 1,5-diazabicyclo[4.3.0]non-5-ene (DBN), substituted guanidines of the formula $(R^1R^2N)(R^3R^4N)C=N-R^5$ (where $R^1$, $R^2$, $R^3$ and $R^4$ are preferably lower alkyl ($C_1$-$C_6$) and $R^5$ is preferably H or lower alkyl ($C_1$-$C_6$)) such as 1,1,3,3-tetramethylguanidine and biguanide, as well as combinations thereof. Other substituent groups on these compounds such as higher alkyl, cycloalkyl, aryl, alkenyl, and substituted alkyl and other structures may also be used.

In some embodiments, the more highly basic non-protogenic nitrogenous compounds can be preferred, since they are capable of maintaining basic conditions favoring $H_2S$ sorption. For this reason, the bases having a $pK_a$ (acid dissociation constant, as measured or predicted at 25° C. in aqueous solution or as measured in another solvent and converted to an aqueous value) of at least 9.0 can be preferred, though higher values of at least 10.0, at least 12.0, or at least 13.0 can be desirable for improved/optimal chemisorption of $H_2S$. A useful means of making an adequate prediction of the $pK_a$ value of the base may be provided by the ACD/PhysChem Suite (a suite of software tools for the prediction of basic physicochemical properties including $pK_a$), available from Advanced Chemistry Development, inc., 110 Yonge Street, Toronto, Ontario, Canada MSC 1T4. Exemplary $pK_a$ values for a limited number compounds (in dimethylsulfoxide) may be found in the Bordwell online $pK_a$ database, http://www.chem.wisc.edu/areas/reich/pkatable/index.htm).

Though the process may be operated with the basic sorbent in the liquid phase, more typically when basic sorbent is used it can be supported on a porous, solid support. To operate using a solid phase sorbent, the basic nitrogenous compound, if liquid (as most are), can be supported on a porous, solid support or carrier material, preferably of relatively high surface area. If the basic compound is a solid, it may be dissolved to form a solution which can then be used to impregnate the support material. Supports of this kind are frequently used as the catalysts in catalytic processes such as hydrogenation, hydrotreating, hydrodewaxing, etc. Common support materials can include carbon (activated charcoal) and/or porous solid oxides of metals and metalloids and mixed oxides, including alumina, silica, silica-alumina, magnesia, and zeolites, as well as combinations thereof. Porous solid polymeric materials can additionally or alternately be suitable, provided that they are resistant to the environment in which the sorption reaction is conducted. As the components of the gas stream tend to have relatively small molecular dimensions, the minimum pore size of the support may not in itself be a severely limiting factor, but, when the basic nitrogenous compound is impregnated, the entrances to the pore systems of small and intermediate pore size zeolites (such as zeolite 4A, erionite, ZSM-5, ZSM-11, and the like) may become occluded by the (bulky) amine component; for this reason, the smaller pore materials may not be preferred, especially with the bases of relatively larger molecular dimensions. Large pore size zeolites with 12-membered ring systems (such as ZSM-4, faujasites such as zeolite X and the variants of zeolite Y including Y, REY, and USY, and the like) may, however, be suitable depending on the dimensions of the basic nitrogenous compound(s) utilized. Amorphous porous solids with a range of different pore sizes may be utilized in embodiments herein, since some of the pores will have openings large enough to accept the basic component and to also allow sufficient access to the components of the gas stream. Supports containing highly acidic reaction sites, as with the more highly active zeolites, can tend to be more susceptible to fouling reactions upon reaction with the nitrogenous compound and may therefore be generally less preferred in some embodiments than the less acidic supports.

A preferred class of solid oxide supports can include but is not limited to mesoporous and/or macroporous silica materials such as the silica compounds of the M41S series, including MCM-41 (hexagonal), MCM-48 (cubic), and other mesoporous materials such as SBA-1, SBA-2, SBA-3, and SBA-15, as well as the KIT series of mesoporous materials such as KIT-1, KIT-5, and KIT-6. Macroporous silicas and other oxide supports such as the commercial macroporous silicas available as Davisil® products may be suitable, e.g., Davisil 634® (~6 nm pore size, ~480 $m^2$/g pore volume), Davisil 635® (~6 nm, ~480 $m^2$/g), and/or Davisil 644® (~15 nm, ~300 $m^2$/g). According to the IUPAC definition, mesoporous materials are those having a pore size of about 2 nm to about 50 nm, and macroporous materials are those having a pore size of over 50 nm. According to the IUPAC, a mesoporous material can be disordered or ordered in a mesostructure. Preferred mesoporous and macroporous support materials can be characterized by a BET surface area of at least 300 $m^2$/g, e.g., at least 500 $m^2$/g, prior to treatment with the base compound. The M41S materials and their synthesis are described in a number of Mobil patents, including U.S. Pat. Nos. 5,102,643, 5,057,296, 5,098,684, and 5,108,725, to which reference is made for a description of them, as well as in the literature in "*The Discovery of ExxonMobil's M41S Family of Mesoporous Molecular Sieves*", Kresge et al. Studies in Surface Science and Catalysis, 148, Ed. Terasaki, Elsevier bV 2004. SBA-15 is described in "*Triblock Copolymer Syntheses of Mesoporous Silica with Periodic 50 to 300 Angstrom Pores*", Dongyuan Zhao, et al. (1998), *Science* 279 (279). KIT-1 is described in U.S. Pat. No. 5,958,368, and other members of the KIT series are known (see, e.g., KIT-6 in *Nanoscale Res Lett.*, 2009 November, 4(11): 1303-1308).

As shown below, the $H_2S/CO_2$ selectivity of the material can be adjusted by the judicious choice of the porous support structure; coupled with the potential for controlling the $H_2S/CO_2$ selectivity by the use of different adsorbent molecules on the support, there is a significant potential for tailoring the selectivity of the adsorbent.

The basic nitrogenous compound may simply be physically sorbed on the support material (e.g., by impregnation or bonded with or grafted onto it by chemical reaction with the base itself or a precursor or derivative in which a substituent group provides the site for reaction with the support material in order to anchor the sorbent species onto the support). Typically, however, bonding is not required for an effective solid phase sorbent material. Support materials containing reactive surface groups (such as the silanol groups found on zeolites and the M41S silica oxides) are typically capable of reacting with siloxane groups in compounds such as trimethoxysilylpropyl-dimethylamine, An alternative method of fixing more volatile adsorbing species on the support can be by first impregnating the species into the pores of the support and then cross-linking them in place through a reaction that does not involve the basic nitrogenous groups responsible for the sorption reaction in order to render the sorbing species non-volatile under the selected sorption conditions. Grafting or bonding methods are known in the technical literature. The molecular dimensions of the base sorbent can advantageously be selected in accordance with the pore dimensions of the support material, since bulky bases/precursors/derivatives may not be capable of entering pores of limited dimensions. A suitable match of base and support may be determined if necessary by empirical means.

Solid phase sorbents will normally be operated in fixed beds contained in a suitable vessel and operated in the conventional cyclic manner with two or more beds in a unit with each bed switched between sorption and desorption and, optionally, purging prior to re-entry into the sorption portion of the cycle. Purging may be carried out with a stream of the purified gas mixture, i.e., a stream of the gas from which the $H_2S$ has been removed in the sorption process. If operated in temperature swing mode, a cooling step will intervene at some point between the desorption step and the next absorption step. Alternatively, moving bed or fluidized bed systems any be used; rotating wheel beds are notably useful in rapid cycle sorption systems. All these systems may be operated in their conventional manner when using the present sorbents.
Process Configuration Though a highly simplified version of a natural gas purification unit operating in the pressure swing adsorption mode is used as an example herein, it should be understood that the swing adsorption unit can operate equally for any reasonable gas separation using an adsorbent material. An incoming natural gas feedstream containing $H_2S$ and $CO_2$, as well as possibly other contaminants such as $N_2$, $SO_2$, mercaptans, and heavier hydrocarbons ($CO_{3+}$), can enter the purification unit, as shown in the various views of FIGS. 1a-c, roughly along and/or parallel to the rotational axis defined by the rotational member and pass through the feed end rotary valve where the incoming gas feedstream is routed to an adsorption bed containing a solid adsorbent material, According to a controlled cycle, other adsorption beds can be in another stage of swing adsorption besides adsorption, such as desorption, purge, regeneration, or the like. The sorption vessels can contain fixed beds of a solid adsorbent material at least a portion of which is selective for the at least one contaminant gas, as described below. The sorption bed can additionally or alternately contain materials that have selectivity for other species, In one embodiment, the bed can be segmented with an initial portion containing an $H_2S$-selective sorbent and the final portion containing a $CO_2$-selective adsorbent. After passing through a bed of adsorbent material in the bed on the adsorption phase of the cycle, the purified gas can exit the bed through the product end rotary valve in the form of a product effluent in which the at least one desired product gas, in this case $CH_4$, has a notably higher concentration than in the feedstream, Purified gas can leave the unit roughly along and/or parallel to the rotational axis defined by the rotational member and pass through the product end rotary valve, e.g using a co-current or counter-current purge gas, when the sorbed contaminant gas is to be purged from the adsorbent material at the end of the adsorption phase in the particular bed. In PSA operations, the bed can advantageously be depressurized before purging, and/or in TSA operations, the bed can advantageously be heated before purging. Contaminant effluent containing the desorbed contaminant can be exhausted from the vessels and the concentrated contaminants recovered and processed, reused, or the like. As shown in FIG. 1d, multiple rotary modules can be combined in an alternating configuration to provide bi-directionality of feed and product, as well as to exploit the advantageous pseudo-frusto-conical shape of the rotary modules according to the invention to reduce the volume swept out by more than one module, thus increasing the per gram adsorptive capacity/efficiency of a multi-module system, such as this one, by at least 10%, e.g., by at least 15%, by at least 20%, by at least 25%, by at least 30%, by at least 35%, by at least 40%, by at least 45%, or by at least 50%. Without being bound by theory, if an upper limit is desired to be placed on the per gram adsorptive capacity/efficiency of the adsorbent material in the multi-module system according to the invention, then that could be up to 200%, e.g., up to 150%, up to 100%, up to 75%, up to 65%, up to 60%, up to 55%, up to 50%, up to 45%, up to 40%, up to 35%, or up to 30%.

Though the shape of the rotary module in FIG. 1 is described as pseud-frusto-conical, it should be understood that other angularized, truncated prismatic-type (multi-sided, optionally even rounded, as opposed to conical) forms are contemplated and can be alternately employed in swing adsorption processes according to the invention.

In operation in the PSA mode, the incoming gas can be passed over the selected bed of sorption material for a fixed time controlled by a cycle controller and/or until contaminant breakthrough is indicated by a stream controller in the vessel. At this point, the valves can be actuated to stop the flow of gas into and out of the vessel which has been in the sorption phase and to re-direct it to another vessel containing freshly purged material. The valves can then be controlled to allow a reduction of pressure in the vessel used for sorption so that the sorbed contaminant(s) can be selectively released from the adsorbent material into the exhaust line. Desorption may be assisted, preferably towards/at the end of the pressure reduction phase, e.g., by purging with a gas stream comprised of recycle product and/or inert gas such as $N_2$. The purge stream may be heated if necessary to facilitate stripping of the adsorbed contaminant(s).

Since the selectivity of the process is typically favored by operation with a non-aqueous sorbent, it can be preferable to maintain the water content of the system at a relatively low level. This, however, is not inconsistent with water in the incoming gas stream at relatively low level, for example, less than 5 mol %, less than 2 mol %, or less than 0.1 mol % (less than 1000 ppm), based on the molar composition of the overall incoming gas feedstream. If, however, water from the gas feedstream tends to accumulate in the sorbent, it may be desirable to remove a slip stream of adsorbent for removal of the water, e.g., by gas stripping, passing over a dryer, heating, and/or by evaporation under reduced pressure. Embodiments herein can additionally or alternately include drying the incoming feed gas to the system to remove a portion of water therefrom by means of dryers, precipitators, condensers, demisters, coalescers, and/or desiccants prior to subjecting the feed gas to the adsorbent systems described herein.

The process may be operated according to conventional operating procedures appropriate to the process variant in use. It may be operated as a conventional PSA (cPSA) or TSA process, purge desorption (purge with inert gas such as nitrogen, which is not adsorbed), displacement purge (displacement with a competitively adsorbed species), or as a combination of these process variants. It may be operated as one of the rapid cycle variants (cycle time for a complete sorption/desorption cycle less than about two minutes, e.g., less than about one minute), including partial pressure swing or displacement purge adsorption (PPSA), rapid cycle pressure swing adsorption (RCPSA), Dual Bed (or Duplex) PSA Process, Dual Reflux PSA Process, rapid cycle partial pressure swing, displacement purge adsorption (RCPPSA) technologies, or rapid cycle thermal swing adsorption (RCTSA) with rapid cycle variants using a solid phase sorbent system. Selection of conditions can frequently be dictated by the conditions (e.g., pressure and flow rate of the entering gas stream, proportion and type of contaminants, and desired pressure for the effluent product stream), with the most appropriate conditions selected on an empirical basis.

Adsorptive kinetic separation processes, apparatuses, and systems, as described above, are useful for development and production of hydrocarbons, such as gas and oil processing. Particularly, the provided processes, apparatuses, and systems can be useful for the rapid, large scale, efficient separation of a variety of target gases from gas mixtures.

The provided processes, apparatuses, and systems may be used to prepare natural gas products by removing contaminants and heavy hydrocarbons (having at least two carbon atoms). The provided processes, apparatuses, and systems can be useful for preparing gaseous feed streams for use in utilities, including separation applications such as dew point control, sweetening/detoxification, corrosion protection/control, dehydration, heating value. conditioning, and purification. Examples of utilities that utilize one or more separation applications can include generation of fuel gas, seal gas, non-potable water, blanket gas, instrument and control gas, refrigerant, inert gas, and hydrocarbon recovery. Exemplary "not to exceed" product (or "target") acid gas removal specifications can include: (a) 2 vol % $CO_2$, 4 ppm $H_2S$; (b) 50 ppm $CO_2$, 4 ppm $H_2S$; or (c) 1.5 vol % 2 ppm $H_2S$.

The provided processes, apparatuses, and systems may be used to remove acid gas from hydrocarbon streams. Acid gas removal technology becomes increasingly important as remaining gas reserves exhibit higher concentrations of acid (sour) gas resources. Hydrocarbon feed streams can vary widely in amount of acid gas, such as from several parts per million to 90 vol %. Non-limiting examples of acid gas concentrations from exemplary gas reserves can include concentrations of at least: (a) 1 vol % $H_2S$, 5 vol % $CO_2$; (b) 1 vol % $H_2S$, 15 vol % $CO_2$; (c) vol % $H_2S$, 60 vol % $CO_2$; (d) 15 vol % $H_2S$, 15 vol % $CO_2$; or (e) 15 vol % $H_2S$, 30 vol % $CO_2$.

One or more of the following may be utilized with the processes, apparatuses, and systems provided herein, to prepare a desirable product stream, while maintaining relatively high hydrocarbon recovery:

(a) using one or more kinetic swing adsorption processes, such as pressure swing adsorption (PSA), thermal swing adsorption (TSA), and partial pressure swing or displacement purge adsorption (PPSA), including combinations of these processes; each swing adsorption process may be utilized with rapid cycles, such as using one or more rapid cycle pressure swing adsorption (RC-PDS) units, with one or more rapid cycle temperature swing adsorption (RC-TSA) units or with one or more rapid cycle partial pressure swing adsorption (RC-PPSA) units; exemplary kinetic swing adsorption processes are described in U.S. Patent Application Publication Nos. 2008/0282892, 2008/0282887, 2008/0282886, 2008/0282885, and 2008/0282884, which are each herein incorporated by reference in its entirety;

(b) removing acid gas with RC-TSA using advanced cycles and purges as described in U.S. Provisional Application No. 61/447,858, filed Mar. 1, 2011, as well as the U.S. patent application Ser. No. 13/406,079, claiming priority thereto, which are together incorporated by reference herein in their entirety;

(c) using a mesopore filler to reduce the amount of trapped methane in the adsorbent and increase the overall hydrocarbon recovery, as described in U.S. Patent Application Publication Nos. 2008/0282892, 2008/0282885, and 2008/028286, each of which is herein incorporated by reference in its entirety;

(d) choosing an appropriate adsorbent materials to provide high selectivity and reduce/minimize adsorption (and losses) of methane and other hydrocarbons, such as one or more of the zeolites described in U.S. Patent Application Publication Nos. 2008/0282887 and 2009/0211441, each of which is herein incorporated by reference in its entirety;

(e) depressurizing one or more RC-PSA units in multiple steps to intermediate pressures so that the acid gas exhaust can be captured at a higher average pressure, thereby decreasing the compression required for acid gas injection; pressure levels for the intermediate depressurization steps may be matched to the interstage pressures of the acid gas compressor to optimize the overall compression system;

(f) using exhaust or recycle streams to minimize processing and hydrocarbon losses, such as using exhaust streams from one or more RC-PSA units as fuel gas instead of re-injecting or venting;

(g) using multiple adsorbent materials in a single bed to remove trace amounts of first contaminants, such as $H_2S$, before removal of a second contaminant, such as $CO_2$; such segmented beds may provide rigorous acid gas removal down to ppm levels with RC-PSA units with minimal purge flow rates;

(h) using feed compression before one or more RC-PSA units to achieve desired product purity;

(j) contemporaneous removal of non-acid gas contaminants such as mercaptans, COS, and BTEX; selection processes and materials to accomplish the same;

(k) using structured adsorbents for gas-solid contactors to minimize pressure drop compared to conventional packed beds;

(l) selecting a cycle time and cycle steps based on adsorbent material kinetics; and (m) using a process and apparatus that uses, among other equipment, two RC-PSA units in series, wherein the first RC-PSA unit cleans a feed stream down to a desired product purity and the second RC-PSA unit cleans the exhaust from the first unit to capture methane and maintain high hydrocarbon recovery; use of this series design may reduce the need for a mesopore filler.

The processes, apparatuses, and systems provided herein can be useful in particularly large gas treating facilities, such as facilities that process more than 75 MSCFD) of natural gas, for example at least 100 MSCFD, at least 125 MSCFD, at least 150 MSCFD, at least 175 MSCFD, at least 200 MSCFD, at least 250 MSCFD, at least 300 MSCFD, at least 400 MSCFD, at least 500 MSCFD, at least 750 MSCFD, at least 1 billion standard cubic feet per day (BSCFD), or at least 2 BSCFD. Additionally or alternately, the processes, apparatuses, and systems provided herein can utilize a single rotary valve gas treatment module (or at most three integrated rotary valve gas treatment modules) according to the invention to attain the desired daily gas flow throughput.

Compared to conventional technology, the provided processes, apparatuses, and systems can require lower capital investment, lower operating cost, and/or less physical space, thereby enabling implementation offshore and in remote locations, such as arctic environments. The provided processes, apparatuses, and systems can provide the foregoing benefits, while providing high product (e.g., hydrocarbon) recovery as compared to conventional technology.

Additionally or alternately, the invention can comprise one or more of the following embodiments.

Embodiment 1. An increased efficiency high-capacity swing adsorption process comprising: providing a feedstream containing a first concentration of at least one desired product gas and a first concentration of at least one contaminant gas, wherein the feedstream is provided at a rate of more than 75 million standard cubic feet per day (MSCFD) (e.g., at least 100 MSCFD, at least 125 MSCFD, at least 150 MSCFD, at least 175 MSCFD, at least 200 MSCFD, at least 250 MSCFD, at least 300 MSCFD, at least 400 MSCFD, at least 500 MSCFD, at least 750 MSCFD, at least 1 billion standard cubic feet per day (BSCFD) or at least 2 BSCFD); contacting the feedstream with an adsorption module having a feed end, a product end, and one or more adsorption beds comprising an adsorption material under conditions sufficient for the adsorption material to selectively adsorb the at least one desired product gas in comparison to the at least one contaminant gas, so as to form a contaminant effluent having a second concentration of the at least one desired product gas that is lower than the first concentration in the feedstream and having a second concentration of the at least one contaminant gas that is higher than the first concentration in the feedstream; and selectively desorbing the at least one desired product gas from the adsorption material, so as to form a product effluent having a third concentration of the at least one desired product gas that is at least 15 wt % (e.g., at least 20 wt %, at least 25 wt %, at least 30 wt %, at least 35 wt %, at least 40 wt %, at least 45 wt %, at least 50 wt %, at least 55 wt %, at least 60 wt %, at least 65 wt %, at least 70 wt %, at least 75 wt %, at least 80 wt %, or at least 85 wt %) higher than the first concentration in the feedstream and having a second concentration of the at least one contaminant gas that is at least 15 wt % (e.g., at least 20 wt %, at least 25 wt %, at least 30 wt %, at least 35 wt %, at least 40 wt %, at least 45 wt %, at least 50 wt %, at least 55 wt %, at least 60 wt %, at least 65 wt %, at least 70 wt %, at least 75 wt %, at least 80 wt %, or at least 85 wt %) lower than the first concentration in the feedstream, wherein the adsorption module contains rotary valves both on the feed end and on the product end of the adsorption bed(s) and a rotational member defining a central rotational axis; wherein the adsorption bed(s) is(are) oriented circumferentially to the rotational member axially surrounding the rotational axis; and wherein one or more of the following are true: (i) the adsorption bed(s) thus (each) comprise an inner wall closest to the rotational axis and an outer wall furthest from the rotational axis, such that the outer wall defines a plane that is non-parallel with a plane defined by the inner wall, such that an intersection angle defined at the convergent interface of the planes is between 10° and 60° (e.g., between 15° and 55°, between 20° and 50°, or between 30° and 45°); (ii) the adsorption bed(s) thus (each) comprise a feed end cross-sectional area and a product end cross-sectional area, such that a ratio of the feed end cross-sectional area to the product end cross-sectional area is from 1.2 to 10 (e.g., from 1.3 to 8, from 1.5 to 6, from 1.7 to 5, or from 2 to 4); and (iii) the feed end rotary valve has a diameter and the product end rotary valve has a diameter, such that the ratio of the feed end rotary valve diameter to the product end rotary valve diameter is from 1.1 to 2.5 (e.g., from 1.2 to 2.3, from 1.3 to 2.1, from 1.4 to 2, or from 1.5 to 1.9).

Embodiment 2. The process of embodiment 1, wherein the feedstream comprises natural gas, the at least one desired product gas comprises $CH_4$, and the at least one contaminant gas comprises $CO_2$, $H_2S$, $NO_x$, $SO_x$, or a combination thereof.

Embodiment 3. The process of embodiment 1, wherein the feedstream comprises a refinery flue gas, the at least one desired product gas comprises $CO_2$, and the at least one contaminant gas comprises $N_2$, $H_2S$, $NO_x$, $SO_x$, or a combination thereof.

Embodiment 4. The process of embodiment 1, wherein the feedstream comprises a hydrocarbon conversion product stream or a chemical plant product or waste stream, the at least one desired product gas comprises an olefin selected from the group consisting of ethylene, propylene, 1-butene, 2-butene, isobutylene, and combinations thereof, and the at least one contaminant gas comprises a saturated hydrocarbon selected from the group consisting of methane, ethane, propane, butane, cyclobutane, pentane, cyclopentane, and combinations thereof.

Embodiment 5. The process of any one of the previous embodiments, further comprising recycling at least a portion of the contaminant effluent from the product end to the feed end of the at least one adsorption module in order to be combined with the feedstream.

Embodiment 6. The process of any one of the previous embodiments, wherein the at least one product effluent is optionally additionally treated to further increase the at least one desired product gas concentration, and then either transported to a remote site or used on site in a further process.

Embodiment 7. An increased efficiency high-capacity swing adsorption process comprising: providing a feedstream containing first concentration of at least one desired product gas and a first concentration of at least one contaminant gas, wherein the feedstream is provided at a rate of more than 75 million standard cubic feet per day (MSCFD) (e.g, at least 100 MSCFD, at least 125 MSCFD, at least 150 MSCFD, at least 175 MSCFD, at least 200 MSCFD, at least 250 MSCFD, at least 300 MSCFD, at least 400 MSCFD, at least 500 MSCFD, at least 750 MSCFD, at least 1 billion standard cubic feet per day (BSCFD), or at least 2 BSCFD); contacting the feedstream with an adsorption module having a feed end, a product end, and one or more adsorption beds comprising an adsorption material under conditions sufficient for the adsorption material to selectively adsorb the at least one contaminant gas in comparison to the at least one desired product gas, so as to form a product effluent having a second concentration of the at least one desired product gas that is at least 15 wt % (e.g., at least 20 wt %, at least 25 wt %, at least 30 wt %, at least 35 wt %, at least 40 wt %, at least 45 wt %, at least 50 wt %, at least 55 wt %, at least 60 wt %, at least 65 wt %, at least 70 wt %, at least 75 wt %, at least 80 wt %, or at least 85 wt %) higher than the first concentration in the feedstream and having a second concentration of the at least one contaminant gas that is at least 15 wt % (e.g., at least 20 wt %, at least 25 wt %, at least 30 wt %, at least 35 wt %, at least 40 wt %, at least 45 wt %, at least 50 wt %, at least 55 wt %, at least 60 wt %, at least 65 wt %, at least 70 wt %, at least 75 wt %, at least 80 wt %, or at least 85 wt %) lower than the first concentration in the feedstream; and selectively desorbing the at least one contaminant gas from the adsorption material, so as to form a product effluent having a third concentration of the at least one desired product gas that is lower than the first concentration in the feedstream and having a second concentration of the at least one contaminant gas that is higher than the first concentration in the feedstream, wherein the adsorption module contains rotary valves both on the feed end and on the product end of the adsorption bed(s) and a rotational member defining a central rotational axis; wherein the adsorption bed(s) is(are) oriented circumferentially to the rotational member axially surrounding the rotational axis; and wherein one or more of the following are true: (i) the adsorption bed(s) thus (each) comprise an inner wall closest to the rotational axis and an outer wall furthest from the rotational axis, such that the outer wall defines a plane that is non-parallel with a plane defined by the inner wall, such that an intersection angle defined at the convergent interface of the planes is between 10° and 60° (e.g., between 15° and 55°, between 20° and 50°, or between 30° and 45°; (ii) the adsorption bed(s) thus (each) comprise a feed end cross-sectional area and a product end cross-sectional area, such that a ratio of the feed end cross-sectional area to the product end cross-sectional area is from 1.2 to 10 (e.g., from 1.3 to 8, from 1.5 to 6, from 1.7 to 5, or from 2 to 4); and (iii) the feed end rotary valve has a diameter and the product end rotary valve has a diameter, such that the ratio of the feed end rotary valve diameter to the product end rotary valve diameter is from 1.1 to 2.5 (e.g., from 1.2 to 2.3, from 1.3 to 2.1, from 1.4 to 2, or from 1.5 to 1.9).

Embodiment 8. The process of embodiment 7, wherein the feedstream comprises air, the at least one desired product gas comprises $N_2$, and the at least one contaminant gas comprises $O_2$.

Embodiment 9. The process of embodiment 7, wherein the feedstream comprises a hydrocarbon conversion product stream or a chemical plant product or waste stream, the at least one desired product gas comprises an olefin selected from the group consisting of ethylene, propylene, 1-butene, 2-butene, isobutylene, and combinations thereof, and the at least one contaminant gas comprises (a) a diolefin selected from the group consisting of 1,3-butadiene, ,3-pentadiene, 1,4-pentadiene, and combinations thereof, (b) an optionally heteroatom-containing hydrocarbon material having a triple bond, such as selected from the group consisting of acetylene and/or acrylonitrile, or a combination of (a) and (b).

Embodiment 10. The process of embodiment 7 or embodiment 8, further comprising recycling at least a portion of the product effluent from the product end to the feed end of the at least one adsorption module in order to be combined with the feedstream.

Embodiment 11. The process of any one of embodiments 7-10, wherein the at least one contaminant effluent is optionally additionally treated to further increase the at least one contaminant gas concentration, and then either transported to a remote site or used on site in a further process.

Embodiment 12. The process of any one of the previous embodiments, wherein the swing adsorption process comprises PSA, TSA, PPSA, PTSA, RC-PSA, RC-TSA, RC-PPSA, or RC-PTSA.

EXAMPLES

Example 1

As discussed above, the various views of FIG. 1 show the use of circumferentially sloped adsorbent beds to allow more efficient use of rotor space. In bulk separation (e.g., $CO_2$ from methane), there can be a relatively large change in gas flow velocity/flux towards the product end during the feed step due to substantial adsorption. To ensure that flow velocity/flux remains within acceptable values, e.g., remains relatively constant, a reduction of adsorbent bed cross-sectional area can be useful, or in some embodiments preferred, for proper operation of bulk separation processes.

In FIG. 1, this reduction in adsorbent bed cross-sectional area from feed end to product end can alternately be expressed in terms of the decreasing size/diameter from the feed end rotary valve to the product rotary valve. According to FIG. 1d, these changes in bed cross-sectional area and rotary valve diameter from feed end to product end can be exploited to co-operatively run multiple (in this case, two) adsorbent modules simultaneously by nesting them, such that one adsorbent module is inverted with respect to the other. This configuration can enable a highly compact large capacity module assembly/system, with feed inlets at alternating ends of the module assembly/system. Modules and their cycles can advantageously be roughly identical in such an embodiment, which can vastly improve pressure-balance and seal-wear characteristic, among other things.

Though FIG. 1 shows embodiments of the compact large scale RCPSA module according to the invention for natural gas separation of methane from carbon dioxide, any swing adsorption mode (pressure, temperature, partial pressure, pressure plus temperature, rapid cycle, or a combination thereof) can be used, and any reasonable sorptive-based separation of gases can be accomplished using techniques, apparatuses, and processes available to those skilled in the art.

Figure 1A:
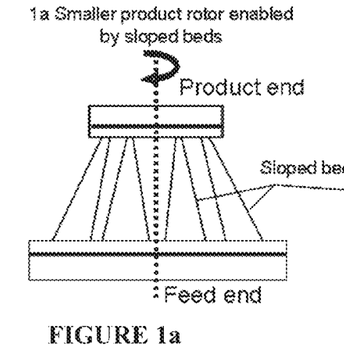
Figure 1B:
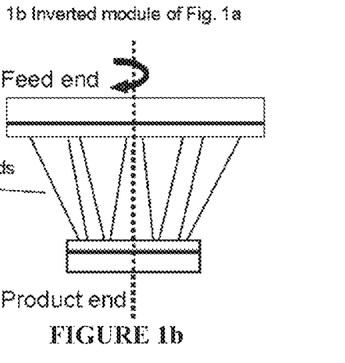
FIG. 1b shows the module in an inverted (product end down) configuration.
Figure 1C:
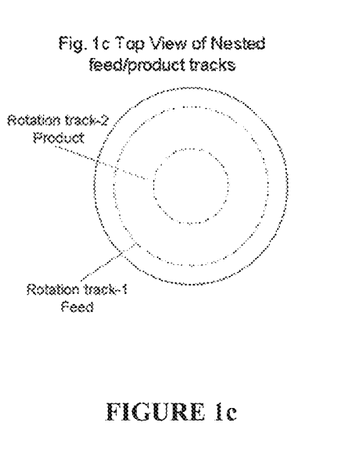
FIG. 1c shows a top-down view along the central rotational axis of the inverted module of FIG. 1b.
Figure 1D:
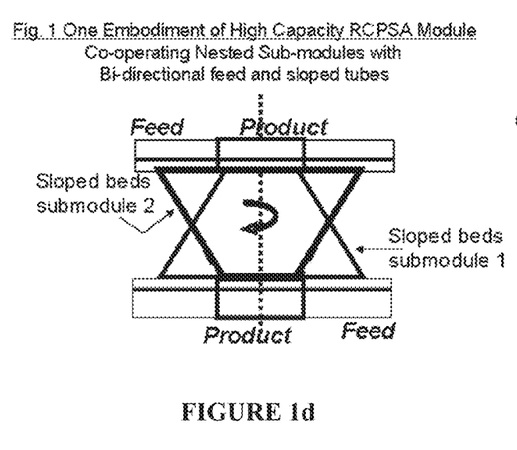
FIG. 1d shows a view of two rotary valved adsorption modules as if FIGS. 1a and 1b were viewed together from the right edge of the page to the left edge, such that the nesting configuration of the standard and inverted modules can be seen to give bi-directionality to both the feed and product effluents.

For an RCPSA process, such a module can have a reduced product rotor diameter, as shown in FIGS. 1a-b, provided the adsorbent bed walls are non-parallel (sloped, angled, or curved) to maintain flow streamlines. In FIGS. 1a-b, the ratio of the feed end rotary valve diameter to the product end rotary valve diameter can be seen to be about 1.9. Such a reduced product rotor diameter can optionally but preferably serve to improve sealing function and/or seal wear-in characteristic and can reduce seal-wear in times. FIG. 1c shows that co-planar feed/product tracks in such modules according to the invention can be widely separated, which can facilitate sealing.

Though the rotary valve adsorption modules described in FIG. 1 are exemplified as modified cylindrical modules having a rotational member rotating around a central rotational axis, to which rotational member is attached a unitary annular (array of) adsorption bed(s) that rotates with the rotational member against both the feed end and the product end rotary valves, it should be understood that variations on this simplistic theme are contemplated. For instance, the otary valve adsorption module in FIGS. 1a-1c and/o one or both of the modules in the rotary valve module assembly in FIG. 1d can be a multi-annular module with a more complex rotational engagement, e.g, such as described in U.S. Pat. No. 7,250,150, the entire contents of which are hereby incorporated by reference.

Example 2

The various views of FIG. 2 show an embodiment based on modifying a commercial RCPSA module to incorporate a curved tubular adsorbent bed within a rotating valve adsorbent module assembly containing at least a first and a second rotor-stator interface and otherwise linear adsorbent containers disposed between them.

Figure 2A:
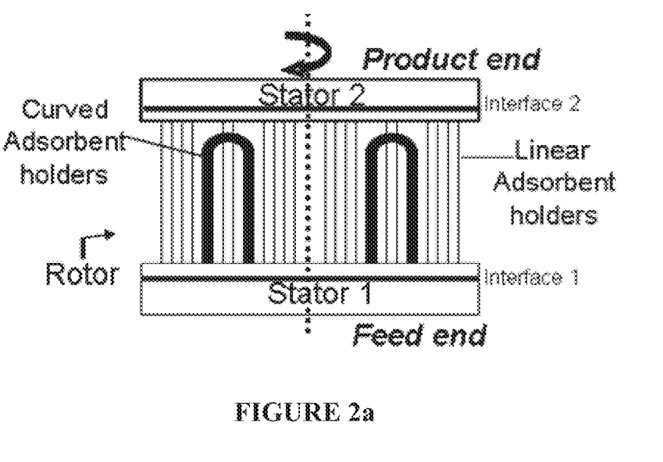
FIG. 2a shows a side view of a rotary valved adsorption module having both linear and curved (u-shaped) adsorbent holders/beds, where the linear adsorbent beds extend normally from feed end to product end, but where the curved (u-shaped) holders/beds originate and terminate at the feed end, allowing easier recycle of contaminant and/or product effluent with the feedstream (details of recycle not shown).

Though in this configuration of FIG. 2a the first (feed end) and second (product end) rotary valves are roughly the same diameter, the configuration of the curved adsorbent holders creates a situation where the number of rotating plate openings in rotor of the second interface is not equal to the number of the inlet and outlet openings of the adsorbent holders, because the curved (u-shaped) adsorbent holders direct some product effluent back toward the feed end, though on an inner track radially displaced from the linear adsorbent holders. Alternately, the radial displacement of the curved (u-shaped) adsorbent holders can be on an outer track, relative to the linear adsorbent holders. In either configuration, the curved (u-shaped) adsorbent holders originate and terminate on the same (first) rotor plate, such that the number of rotating plate openings in rotor of the first interface is not equal to the number of the inlet and outlet openings of all the adsorbent holders.

Using such curved (u-shaped) adsorbent holders can advantageously allow sequential flow, with the added benefit of enabling co-current purge more easily through the curved (u-shaped) adsorbent holders so as to allow recycle of one of the effluents. If it is desired to remove additional desired product gas from the contaminant effluent, then the desorption/purge stream can be recycled back to the feed inlet more readily and with less piping, due to its exit and entry being on the feed end. Further, if it is desired to additionally purify the product effluent to further increase the concentration of the desired product gas, then the sorption stream can be recycled back to the feed inlet more readily and with less piping, again due to its exit and entry being on the feed end. In this way, the curved (u-shaped) adsorbent holders can enable more plentiful as well as more efficient recycle options within a rotary adsorption module.

In some embodiments, the curved portion of the u-shaped adsorbent holders can be empty, can contain non-adsorbent, or can contain flow distributing means and/or temperature control mechanisms.

Optionally, the combination of linear and curved (u-shaped) adsorbent tubes/holders can be utilized in combination with the non-parallel-sided apparatus/process shown in FIG. 1, such that adsorbent bed wall angles, adsorbent bed cross-sectional areas, and/or adsorbent module rotary valve diameters can vary from feed end to product end.

Though any sufficient adsorbent can be used in the apparatus of this Example 2, the adsorbent material can preferably be structured and/or can comprise or consist of composites/mixtures/zones of materials that can include, but that are not necessarily limited to, aluminas, carbons, carbon, activated carbons, molecular sieves, silicas, silicalite, zeolites, MGM/ZSM framework type catalyst materials, ITQ/DDR framework type materials, modified ITQ/DDR adsorbent materials, nanotubular deployments thereof, and the like, and combinations thereof.

Figure 2B:
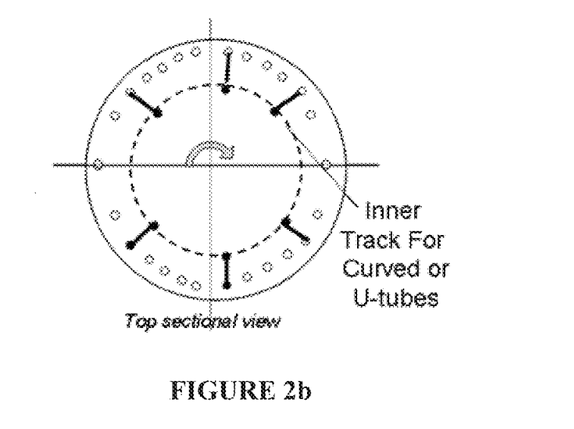
FIG. 2b shows a top-down view along the central rotational axis of the module in FIG. 2a, indicating a radial separation of the exit track of the curved (u-shaped) adsorbent holders/beds from the entry track for both the linear and curved adsorbent holders/beds.

One feature of the embodiment of Example 2 can include the ability to improve feed quality with the internal recycle offered by the curved adsorbent acting effectively as a first stage. The top view in FIG. 2b shows curved tube inlet and outlet ends rotated in separate annular tracks. Other arrangements (not shown) are possible, including where linear and curved tube cycles interact or are interdependent As with FIG. 1, the motor and feed/product/exhaust ports are not shown in FIG. 2.

Though the rotary valve adsorption modules described in FIG. 2 are exemplified as modified cylindrical modules having a rotational member rotating around a central rotational axis, to which rotational member is attached a unitary annular (array of) adsorption bed(s) that rotates with the rotational member against both the feed end and the product end rotary valves, it should be understood that variations on this simplistic theme are contemplated. For instance, the rotary valve adsorption module in FIGS. 2a-2b can be a multi-annular module with a more complex rotational engagement, e.g, such as described in U.S. Pat. No. 7,250,150, the entire contents of which are hereby incorporated by reference.

What is claimed is:

1. An increased efficiency high-capacity swing adsorption process comprising:

providing a feedstream containing a first concentration of at least one desired product gas and a first concentration of at least one contaminant gas, wherein the feedstream is provided at a rate of at least 100 million standard cubic feet per day (MSCFD);

contacting the feedstream with an adsorption module having a feed end, a product end, and or e or more adsorption beds comprising an adsorption material under conditions sufficient for the adsorption material to selectively adsorb the at least one desired product gas in comparison to the at least one contaminant gas, so as to form a contaminant effluent having a second concentration of the at least one desired product gas that is lower than the first concentration in the feedstream and having a second concentration of the at least one contaminant gas that is higher than the first concentration in the feedstream; and selectively desorbing the at least one desired product gas from the adsorption material, so as to form a product effluent having a third concentration of the at least one desired product gas that is at least 20 wt % higher than the first concentration in the feedstream and having a second concentration of the at least one contaminant gas that is at least 20 wt % lower than the first concentration in the feedstream, wherein the adsorption module contains rotary valves both on the feed end and on the product end of the adsorption bed(s) and a rotational member defining a central rotational axis; wherein the adsorption bed(s) is(are) oriented circumferentially to the rotational member axially surrounding the rotational axis; and wherein one or more of the following are true:

the adsorption bed(s) thus (each) comprise an inner wall closest to the rotational axis and an outer wall furthest from the rotational axis, such that the outer wall defines a plane that is non-parallel with a plane defined by the inner wall, such that an intersection angle defined at the convergent interface of the planes is between 10° and 60°;

the adsorption bed(s) thus (each) comprise a feed end cross-sectional area and a product end cross-sectional area, such that a ratio of the feed end cross-sectional area to the product end cross-sectional area is from 12 to 10; and the feed end rotary valve has a diameter and the product end rotary valve has a diameter, such that the ratio of the feed end rotary valve diameter to the product end rotary valve diameter is from 1.1 to 2.5.

2. The process of claim 1, wherein the feedstream comprises natural gas, the at least one desired product gas comprises $CH_4$, and the at least one contaminant gas comprises $CO_2$, $H_2S$, $NO_x$, $SO_x$, or a combination thereof.

3. The process of claim 1, wherein the feedstream comprises a refinery flue gas, the at least one desired product gas comprises $CO_2$, and the at least one contaminant gas comprises $N_2$, $H_2S$, $NO_x$, $SO_x$, or a combination thereof.

4. The process of claim 1, wherein the feedstream comprises a hydrocarbon conversion product stream or a chemical plant product or waste stream, the at least one desired product gas comprises an olefin selected from the group consisting of ethylene, propylene, 1-butene, 2-butene, isobutylene, and combinations thereof, and the at least one contaminant gas comprises a saturated hydrocarbon selected from the group consisting of methane, ethane, propane, butane, cyclobutane, pentane, cyclopentane, and combinations thereof.

5. The process of claim 1, wherein the adsorption bed(s) thus (each) comprise an wall closest to the rotational axis and an outer wall furthest from the rotational axis, such that the outer wall defines a plane that is non-parallel with a plane defined by the inner wall, such that an intersection angle defined at the convergent interface of the planes is between 30° and 45°.

6. The process of claim 1, wherein the adsorption bed(s) thus (each) comprise a feed end cross-sectional area and a product end cross-sectional area, such that a ratio of the feed end cross-sectional area to the product end cross-sectional area is from 1.7 to 5.

7. The process of claim 1, wherein the feed end rotary valve has a diameter and the product end rotary valve has a diameter, such that the ratio of the feed end rotary valve diameter to the product end rotary valve diameter is from 1.4 to 2.

8. The process of claim 1, wherein the feedstream is provided at a rate of at least 200 MSCFD.

9. The process of claim 1, wherein the swing adsorption process comprises PSA, TSA, PPSA, PTSA, RC-PSA, RC-TSA, RC-PPSA, or RC-PTSA.

10. The process of claim 1, further comprising recycling at least a portion of the contaminant effluent from the product end to the feed end of the at least one adsorption module in order to be combined with the feedstream.

11. The process of claim 1, wherein the at least one product effluent is optionally additionally treated to further increase the at least one desired product gas concentration, and then either transported to a remote site or used on site in a further process.

12. An increased efficiency high-capacity swing adsorption process comprising:
providing a feedstream containing a first concentration of at least one desired product gas and a first concentration of at least one contaminant gas, wherein the feedstream is provided at a rate of at least 100 million standard cubic feet per day (MSCFD);
contacting the feedstream with an adsorption module having a feed end, a product end, and one or more adsorption beds comprising an adsorption material under conditions sufficient for the adsorption material to selectively adsorb the at least one contaminant gas in comparison to the at least one desired product gas, so as to form a product effluent haying a second concentration of the at least one desired product gas that is at least 15 wt % higher than the first concentration in the feedstream and having a second concentration of the at least contaminant gas that is at least 15 wt % lower than the first concentration in the feedstream; and
selectively desorbing the at least one contaminant gas from the adsorption material, so as to form a product effluent haying a third concentration of the at least one desired product gas that is lower than the first concentration in the feedstream and haying a second concentration of the at least one contaminant gas that is higher than the first concentration in the feedstream,
wherein the adsorption module contains rotary valves both on the feed end and on the product end of the adsorption bed(s) and a rotational member defining a central rotational axis; wherein the adsorption bed(s) is(are) oriented circumferentially to the rotational member axially surrounding the rotational axis; and wherein one or more of the following are true:
the adsorption bed(s) thus (each) comprise an inner wall closest to the rotational axis and an outer wall furthest from the rotational axis, such that the outer wall defines a plane that is non-parallel with a plane defined by the inner wall, such that an intersection angle defined at the convergent interface of the planes is between 10° and 60°;
the adsorption bed(s) thus (each) comprise a feed end cross-sectional area and a product end cross-sectional area, such that a ratio of the feed end cross-sectional area to the product end cross-sectional area is from 1.2 to 10; and
the feed end rotary valve has a diameter and the product end rotary salve has a diameter, such that the ratio of the feed end rotary valve diameter to the product end rotary valve diameter is from 1.1 to 2.5.

13. The process of claim 12, wherein the feedstream comprises air, the at least one desired product gas comprises $N_2$, and the at least one contaminant gas comprises $O_2$.

14. The process of claim 12, wherein the feedstream comprises a hydrocarbon conversion product stream or a chemical plant product or waste stream, the at least one desired product gas comprises an olefin selected from the group consisting of ethylene, propylene, 1-butene, 2-butene, isobutylene, and combinations thereof, and the at least one contaminant gas comprises (a) a diolefin selected from the group consisting of 1,3-butadiene, 1,3-pentadiene, 1,4-pentadiene, and combinations thereof, (b) an optionally heteroatom-containing hydrocarbon material having a triple bond, such as selected from the group consisting of acetylene and/or acrylonitrile, or a combination of (a) and (b).

15. The process of claim 12, wherein the adsorption bed(s) thus (each) comprise an inner wall closest to the rotational axis and an outer wall furthest from the rotational axis, such that the outer wall defines a plane that is non-parallel with a plane defined by the inner wall, such that an intersection angle defined at the convergent interface of the planes is between 30° and 45°.

16. The process of claim 12, wherein the adsorption bed(s) thus (each) comprise a feed end cross-sectional area and a product end cross-sectional area, such that a ratio of the feed end cross-sectional area to the product end cross-sectional area is from 1.7 to 5.

17. The process of claim 12, wherein the feed end rotary valve has a diameter and the product end rotary valve has a diameter, such that the ratio of the feed end rotary valve diameter to the product end rotary valve diameter is from 1.4 to 2.

18. The process of claim 12, wherein the feedstream is provided at a rate of at least 200 MSCFD.

19. The process of claim 12, wherein the swing adsorption process comprises PSA, TSA, PPSA, PTSA, RC-PSA, RC-TSA, RC-PPSA, or RC-PTSA.

20. The process of claim 12, further comprising recycling at least a portion of the product effluent from the product end to the feed end of the at least one adsorption module in order to be combined with the feedstream.

21. The process of claim 12, wherein the at least one contaminant effluent is optionally additionally treated to further increase the at least one contaminant gas concentration, and then either transported to a remote site or used on site in a further process.

* * * * *